United States Patent
Trostle et al.

(10) Patent No.: US 10,391,824 B2
(45) Date of Patent: Aug. 27, 2019

(54) TIRE INFLATION SYSTEM AND METHOD OF CONTROL

(71) Applicant: ArvinMeritor Technology, LLC, Troy, MI (US)

(72) Inventors: Robert W. Trostle, Royal Oak, MI (US); Anatoli Koulinitch, Farmington Hills, MI (US); Kenneth Flory, Commerce Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 201 days.

(21) Appl. No.: 14/029,884

(22) Filed: Sep. 18, 2013

(65) Prior Publication Data

US 2015/0075672 A1 Mar. 19, 2015

(51) Int. Cl.
*B60C 29/00* (2006.01)
*B60C 23/00* (2006.01)

(52) U.S. Cl.
CPC ............ *B60C 29/00* (2013.01); *B60C 23/003* (2013.01)

(58) Field of Classification Search
CPC ......... B60C 23/10; B60C 23/02; B60C 29/00; B60C 23/003
USPC ...................................................... 141/4, 83
See application file for complete search history.

(56) References Cited

U.S. PATENT DOCUMENTS

| | | | |
|---|---|---|---|
| 1,618,953 A * | 2/1927 | Penn ........................... | 137/224.5 |
| 2,663,310 A * | 12/1953 | Heckman et al. ......... | 137/224.5 |
| 4,212,334 A * | 7/1980 | Dudar ..................... | B60S 5/046 137/224 |
| 4,236,622 A * | 12/1980 | Stevenson ..................... | 194/296 |
| 4,333,491 A * | 6/1982 | Knubley ................ | B60S 5/046 137/116.3 |
| 4,441,539 A * | 4/1984 | Hulse ............................ | 152/417 |
| 4,640,331 A | 2/1987 | Braun et al. | |
| 4,694,409 A * | 9/1987 | Lehman .................. | B60S 5/046 222/52 |
| 4,702,287 A * | 10/1987 | Higbie .................... | B60S 5/046 141/4 |
| 5,180,456 A | 1/1993 | Schultz et al. | |
| 5,309,969 A | 5/1994 | Mittal | |
| 5,413,159 A | 5/1995 | Olney et al. | |
| 5,611,875 A * | 3/1997 | Bachhuber .............. | B60S 5/046 141/197 |
| 5,734,319 A * | 3/1998 | Stephens ............... | B60C 23/061 340/442 |
| 6,561,017 B1 * | 5/2003 | Claussen et al. ............... | 73/146 |
| 6,666,078 B1 * | 12/2003 | Claussen et al. ............... | 73/146 |
| 6,868,719 B1 * | 3/2005 | Claussen et al. ............ | 73/146.2 |

(Continued)

OTHER PUBLICATIONS

European Patent Office, European Search Report for the corresponding European Patent Application No. 14 18 4854 dated Jan. 22, 2015.

(Continued)

*Primary Examiner* — Timothy L Maust
*Assistant Examiner* — James R Hakomaki
(74) *Attorney, Agent, or Firm* — Brooks Kushman P.C.

(57) ABSTRACT

A system and method of controlling inflation of a tire. Tire pressure may be determined by providing pulses of pressurized gas to a tire valve. The pulses of pressurized gas may not open the tire valve when the tire pressure is greater than or equal to the target tire pressure, thereby inhibiting overinflation.

20 Claims, 2 Drawing Sheets

(56) References Cited

U.S. PATENT DOCUMENTS

| | | |
|---|---|---|
| 6,894,607 B1 * | 5/2005 | Claussen ............... B60C 23/003 |
| | | 137/225 |
| 6,994,136 B2 | 2/2006 | Stanczak |
| 7,430,900 B2 * | 10/2008 | Belanger ......................... 73/146 |
| RE41,756 E | 9/2010 | Claussen et al. |
| 7,931,061 B2 | 4/2011 | Gonska et al. |
| 2004/0055291 A1 | 3/2004 | Meydieu et al. |
| 2004/0173296 A1 | 9/2004 | White et al. |
| 2005/0194080 A1 | 9/2005 | White et al. |
| 2006/0076095 A1 * | 4/2006 | Oshiro .................. B60C 23/003 |
| | | 152/154.1 |
| 2012/0186714 A1 | 7/2012 | Richardson |
| 2012/0234447 A1 | 9/2012 | Narloch et al. |
| 2015/0375577 A1 | 12/2015 | Serbu et al. |

OTHER PUBLICATIONS

Meritor an ArvinMeritor brand, Meritor Tire Inflation System (MTIS) by PSI (TM), including Mentor ThermALERT (TM), PB-9999, revised May 2007.

* cited by examiner

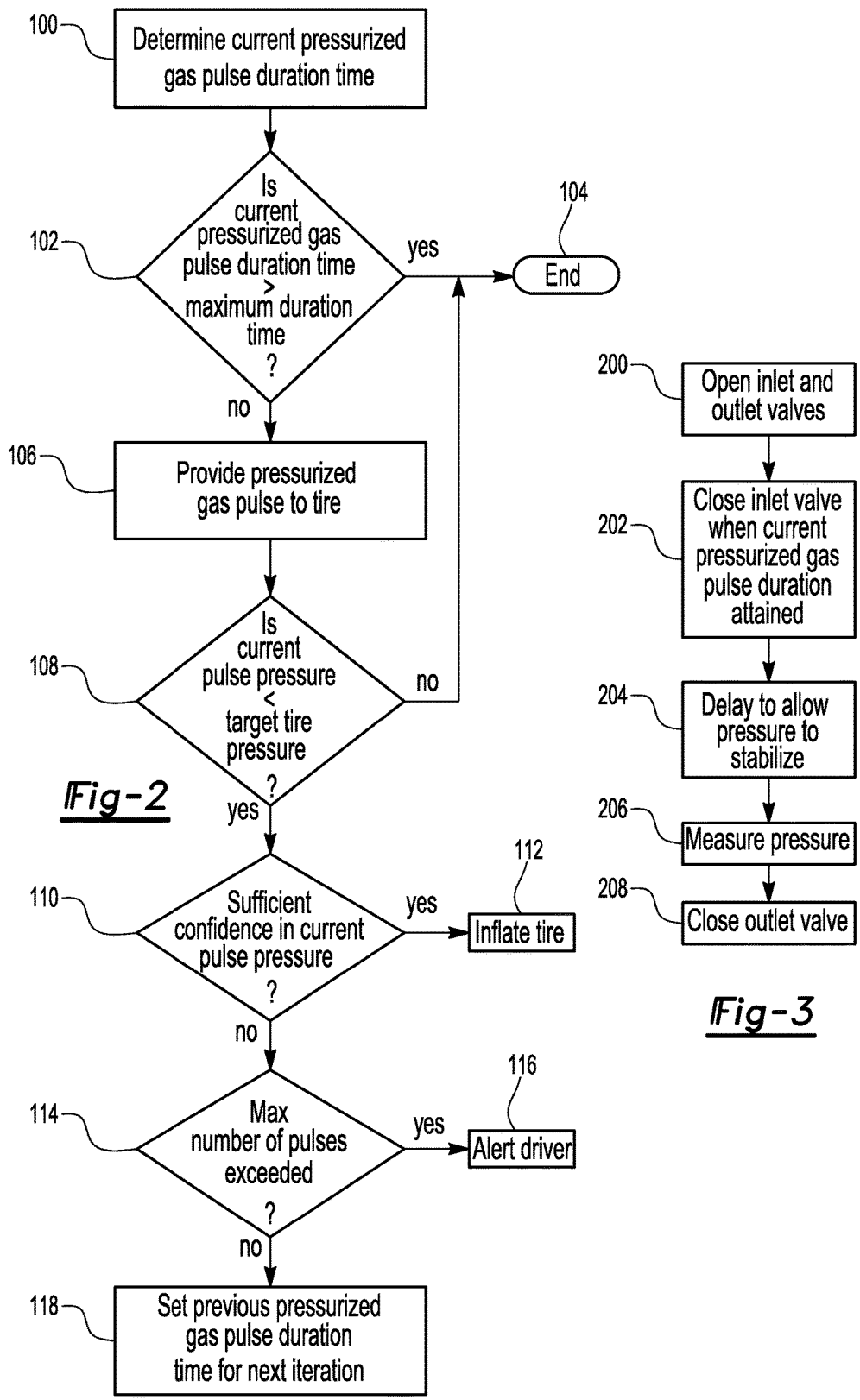

TIRE INFLATION SYSTEM AND METHOD OF CONTROL

TECHNICAL FIELD

This patent application relates to a tire inflation system and a method of control.

BACKGROUND

A tire pressure monitoring method is disclosed in U.S. Reissue Pat. No. RE41,756.

SUMMARY

In at least one embodiment, a method of controlling inflation of a tire is provided. The method may include determining tire pressure by providing a pulse of pressurized gas to a tire valve and measuring a pressure of the pulse of pressurized gas. The pulse of pressurized gas may not open the tire valve when the tire pressure is greater than or equal to the target tire pressure.

In at least one embodiment, a method of controlling inflation of a tire is provided. The method may include determining a first pressurized gas pulse duration time. A first pulse of pressurized gas may be provided to a tire for the first pressurized gas pulse duration time. Pressure of the pressurized gas associated with the first pulse may be measured. A second pressurized gas pulse duration time may be determined. The second pulse of pressurized gas may be provided to the tire for the second pressurized gas pulse duration time. Pressure of the pressurized gas associated with the second pulse may be measured. The pressure associated with the first pulse may be compared with the pressure associated with the second pulse. The tire may be underinflated when the pressure associated with the first pressurized gas pulse is within a predetermined amount of the pressure associated with the second pressurized gas pulse.

In at least one embodiment, a tire inflation system is provided. The system may include a pressurized gas source, an outlet valve, an inlet valve, a first pressure sensor, and a second pressure sensor. The pressurized gas source may be configured to provide a pressurized gas. The outlet valve may control flow of pressurized gas to a tire. The inlet valve may control flow of pressurized gas to the outlet valve. The first pressure sensor may detect pressure of the pressurized gas provided by the pressurized gas source. The second pressure sensor may be disposed between the inlet valve and the outlet valve. A pulse of pressurized gas may be delivered from the pressurized gas source to the tire by opening the outlet valve and the inlet valve, closing the inlet valve after a current pressurized gas pulse duration time has elapsed, waiting for a predetermined period of time to allow the pressure to stabilize between the inlet valve and the tire, and measuring pressure with the second pressure sensor. The measured pressure may be indicative of tire pressure when the pulse pressure is less than a target tire pressure and the measured pressure is within a threshold amount of a pressure of a previous pressure pulse.

BRIEF DESCRIPTION OF THE DRAWINGS

FIG. 2 is a flowchart of an exemplary method of control of the tire inflation system.

FIG. 3 is a flowchart of a method of providing a pressurized gas pulse.

DETAILED DESCRIPTION

Figure 1:
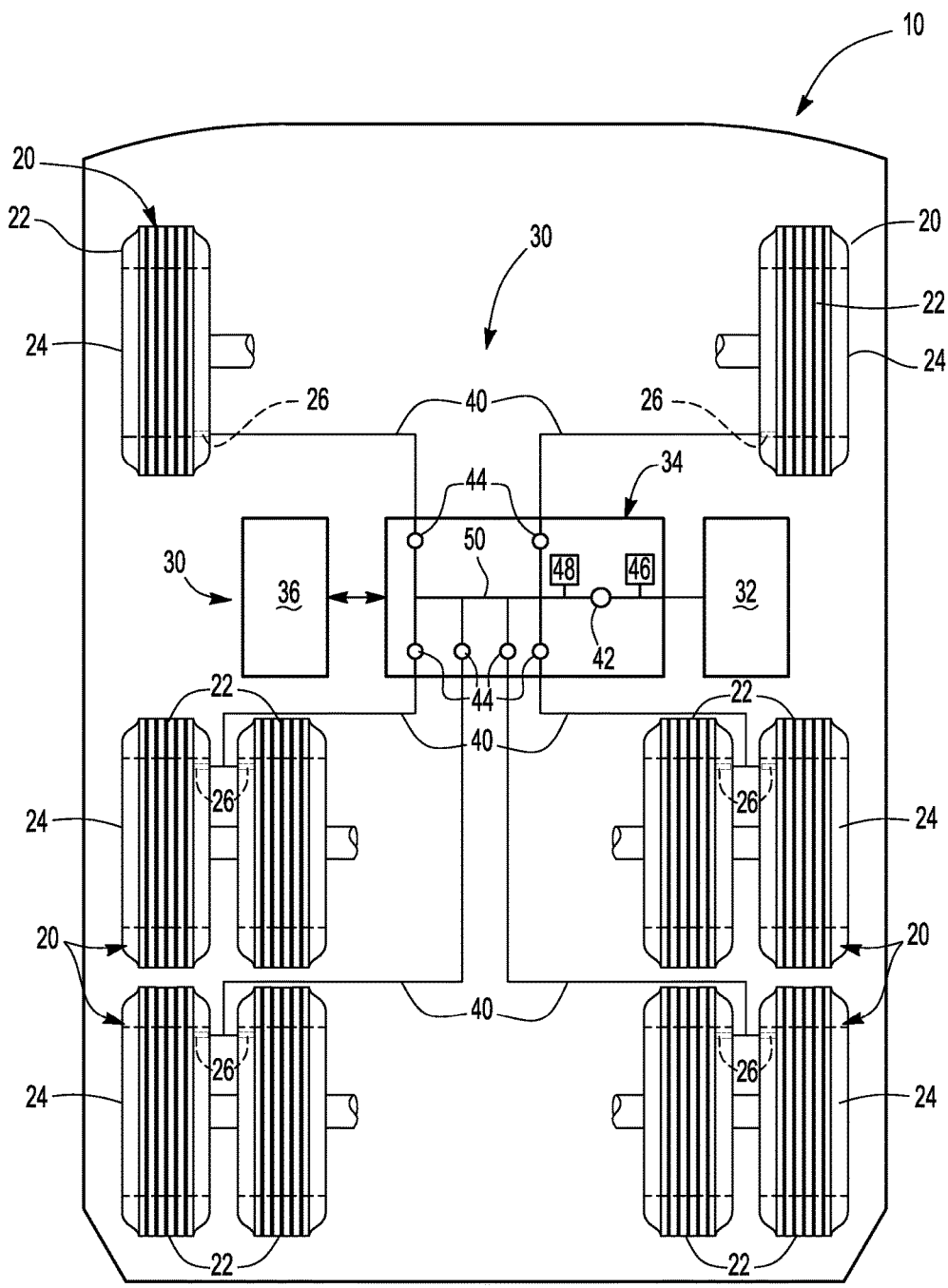
FIG. 1 is a schematic of an exemplary vehicle having a tire inflation system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels.

The vehicle 10 may include a plurality of wheel assemblies 20. Each wheel assembly 20 may include at least one inflatable tire 22 that may be mounted on an associated wheel 24. Each tire 22 may have a tire valve 26 that may facilitate inflation of the tire 22. A tire valve 26 may extend through a hole in an associated wheel 24 and may be configured to provide gas to a chamber that may be at least partially defined by the tire 22 and the wheel 24. Each tire valve 26 may be normally closed to inhibit pressurized gas from exiting the tire 22 through the tire valve 26. The tire valve 26 may open when pressurized gas is supplied to the tire valve 26 under sufficient pressure, such as a pressure that is greater than the pressure inside the tire 22. In FIG. 1, the tire valve locations are generalized for illustration purposes and are not intended to be limiting.

The vehicle 10 may also include a tire inflation system 30 that may monitor or determine tire pressure and that may inflate one or more tires 22. More specifically, the tire inflation system 30 may be configured to provide a pressurized gas or pressurized gas mixture to one or more tires 22 via a corresponding tire valve 26. For clarity, the term "pressurized gas" may refer to a pressurized gas or a pressurized gas mixture in this application. The tire inflation system 30 may include a pressurized gas source 32, a gas supply subsystem 34, and a control system 36.

The pressurized gas source 32 may be configured to supply and/or store a volume of a pressurized gas or pressurized gas mixture, such as air and/or nitrogen. For example, the pressurized gas source 32 may include a tank and/or a pump like a compressor that may be driven by a vehicle engine or vehicle power source. The pressurized gas source 32 may be disposed on the vehicle 10 and may be configured to provide a pressurized gas or pressurized gas mixture at a pressure that is greater than or equal to a target tire inflation pressure or a target inflation pressure of a tire 22. Each tire 22 may or may not have the same target tire pressure in one or more embodiments.

The gas supply subsystem 34 may fluidly connect the pressurized gas source 32 to one or more tires 22. The gas supply subsystem 34 may include one or more conduits 40, such as a hose, tubing, pipe, or combinations thereof, which may provide pressurized gas to at least one tire 22 via a corresponding tire valve 26. The conduit configuration in FIG. 1 is merely exemplary. For instance, a single conduit 40 may be associated with each tire 22 rather than multiple tires as is shown in the bottom half of FIG. 1. In at least one embodiment, the gas supply subsystem 34 may include an inlet valve 42, at least one outlet valve 44, a first pressure sensor 46, and a second pressure sensor 48.

The inlet valve 42 may enable or disable the flow of pressurized gas from an outlet of the pressurized gas source 32 to at least one outlet valve 44. Operation of the inlet valve 42 may be controlled by the control system 36. For instance, the inlet valve 42 may include or may be controlled by an actuator, such as solenoid, that may actuate the inlet valve 42 between an open position and a closed position. In the open position, pressurized gas may flow from the pressurized gas source 32 to a manifold 50. The manifold 50 may distribute pressurized gas to multiple conduits 40 and may be disposed between the inlet valve 42 and one or more outlet valves 44. In the closed position, pressurized gas may be inhibited from flowing from the pressurized gas source 32 to the manifold 50. In at least one embodiment, the inlet valve 42 may be normally closed under predetermined operating conditions, such as when the vehicle 10 is not operational or turned off or when the vehicle engine is not running. As such, the inlet valve 42 may inhibit depressurization of the pressurized gas source 32 in the event of a downstream leak.

The outlet valve 44 may enable or disable the flow of pressurized gas from the manifold 50 to a tire 22 or tire valve 26. In FIG. 1, six outlet valves 44 are shown, although it is contemplated that a greater or lesser number of outlet valves 44 may be provided. Each outlet valve 44 may be associated with a different tire 22 and a different conduit 40. Moreover, each outlet valve 44 may be actuated independently of the inlet valve 42 and independently of each other. As such, the inflation and pressure assessment of different tires 22 or sets of tires 22 may be independently controlled. Operation of the outlet valve 44 may be controlled by the control system 36. For instance, the outlet valve 44 may include or may be controlled by an actuator, such as solenoid, that may actuate the outlet valve 44 between an open position and a closed position. In the open position, pressurized gas may flow from the manifold 50 to at least one corresponding tire valve 26. In the closed position, pressurized gas may be inhibited from flowing from the manifold 50 to at least one corresponding tire valve 26. As such, pressurized gas may not be constantly provided to one or more tires 22, which may facilitate the use of pressure pulses to determine tire pressure as will be discussed in more detail below. In addition, the outlet valve 44 may allow a conduit 40 to be vented to the surrounding environment between the outlet valve 44 and a corresponding tire valve 26. In at least one embodiment, the outlet valve 44 may be normally closed under predetermined operating conditions, such as when the vehicle 10 is not operational or turned off or when the vehicle engine is not running.

The first pressure sensor 46 may be configured to detect the pressure of the pressurized gas provided by the pressurized gas source 32. The first pressure sensor 46 may be of any suitable type and may be fluidly connected to the pressurized gas source 32. For example, the first pressure sensor 46 may be fluidly connected to the pressurized gas source 32 between the pressurized gas source 32 and the inlet valve 42.

The second pressure sensor 48 may be configured to detect the pressure of the pressurized gas provided to a tire 22 or tire valve 26. The second pressure sensor 48 may be of any suitable type and may be disposed between the inlet valve 42 and the tire valve 26 and may be fluidly connected to the manifold 50. As such, the second pressure sensor 48 may be isolated from the pressurized gas source 32 by closing the inlet valve 42. In at least one embodiment, the second pressure sensor 48 may be disposed between the inlet valve 42 and one or more outlet valves 44 so that the second pressure sensor 48 may be used to detect the pressure of pressurized gas supplied to different tires. Alternatively, multiple second pressure sensors 48 may be provided that may detect the pressure supplied to a particular conduit 40 or particular tire 22.

The control system 36 may monitor and control operation of the tire inflation system 30. The control system 36 may include one or more electronic controllers or control modules that may monitor and/or control various components of the tire inflation system 30. For example, the control system 36 may be configured to control actuation of the inlet valve 42 and the outlet valve 44 to control the flow of pressurized gas. In addition, the control system 36 may be configured to receive data from the first pressure sensor 46 and the second pressure sensor 48 that may be indicative of pressure. In FIG. 1, communication between the control system 36 and these components is represented by the double arrowed line that is located adjacent to the control system 36.

Referring to FIG. 2, a flowchart of an exemplary method of control of the tire inflation system 30 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the control system 36 and may be implemented as a closed loop control system. Moreover, the method may be enabled or disabled based on the operating state of the vehicle 10. For example, the method or control logic may be enabled when the vehicle ignition is turned on, the engine is running, or when the vehicle is in motion in one or more embodiments. In addition, the method may be manually activated.

The method will be primarily described in the context of evaluating the pressure of a single tire, but it is to be understood that the method may be applied to evaluate and/or adjust the pressure of multiple tires or sets of tires.

As an overview, the method may determine tire pressure and inflate a tire or alert a driver as appropriate depending on the tire pressure. Tire pressure may be determined by routing multiple pulses of pressurized gas to a tire or tire valve rather than directly measuring tire pressure with a pressure sensor disposed inside the tire. Pulses may increase in magnitude. As such, the duration of a pulse or force exerted by a pulse may be greater than the duration or force exerted by a previous pulse. The pulses may be provided at less than a desired or target tire pressure and thus may not open an associated tire valve when the tire pressure is greater than or equal to the target tire pressure. As such, the tire valve may not open in response to a pulse and the pressure in the tire may not equalize with pressure in the conduit that supplies the pulse to the tire. Accordingly, the method may inhibit tire overinflation that may occur when pressurized gas or a pressurized gas pulse opens the tire valve. For example, tire pressure may be determined by opening a tire valve with a pressurized gas pulse, allowing the pressure in the tire to equalize with pressure in the supply conduit, and then measuring the pressure. As such, the pressurized gas or pressurized gas pulse forces an additional volume of pressurized gas into the tire, thereby increasing the tire pressure. The cumulative effect of multiple pressure pulses may result in overinflation of the tire. Thus, providing pressure pulses that do not exceed the target tire pressure may allow the tire valve to remain closed and inhibit tire overinflation unless the tire is underinflated.

At block 100, a current pressurized gas pulse duration time may be determined. The current pressurized gas pulse duration time may be the length of time or duration of a pressurized gas pulse in which pressurized gas is provided from the pressurized gas source 32 to the tire valve 26. The current pressurized gas pulse duration time may be configured to not open the tire valve 26 when the associated tire 22 is inflated at or above the target tire pressure. The target tire pressure may be a predetermined value that may be indicative of a desired tire pressure and may account for design tolerances of the tire valve 26 or the tolerance range associated with opening the tire valve 26. The current pressurized gas pulse duration time may be calculated or determined in various ways. For example, the current pressurized gas pulse duration time may be based on a previous pressurized gas pulse duration time and the pressure of the pressurized gas provided by the pressurized gas source.

The previous pressurized gas pulse duration time may be generated and stored in memory during a previous iteration. Initially or during an initial iteration, the previous pressurized gas pulse duration time may be a default value or default period of time. Such a default value or default period of time may be configured to provide a pulse that is less than the target tire pressure to reduce the likelihood of opening the tire valve 26 during the first iteration even if the tire is underinflated. After the initial iteration, a previous pressurized gas pulse duration time may be retrieved from memory and based on the preceding iteration.

The pressure of the pressurized gas supplied by the pressurized gas source 32 (which may also be referred to as the supply pressure) may be detected by or based on data from the first pressure sensor 46. The pressure of gas from the pressurized gas source 32 may not be constant. For example, the supply pressure may increase due to operation of the pump or compressor and may decrease in response to system demand, such as operation of pneumatic components like pneumatic actuators or pneumatic brakes. Lower supply pressure from the pressurized gas source 32 may reduce the flow rate, thereby increasing the amount of time that the inlet valve 42 may be opened to provide a pressure pulse having a desired magnitude or that exerts a desired force on the tire valve 26. Conversely, higher supply pressure from the pressurized gas source 32 may increase the flow rate, thereby decreasing the amount of time that the inlet valve 42 is opened to provide a pressure pulse of the same magnitude. The pressure data from the first pressure sensor 46 may be used to calculate or obtain an adjustment value that may account for supply pressure variations. For example, the supply pressure provided by the first pressure sensor 46 may be used to calculate an adjustment value or reference an adjustment value in a lookup table that may be populated with a set of adjustment values that may be obtained by development testing. Each adjustment value in a lookup table may be associated with a corresponding supply pressure value. The adjustment value may be a positive value, negative value, or zero. The current pressurized gas pulse duration time may be obtained by adding the adjustment value to the previous pressurized gas pulse duration time.

At block 102, the current pressurized gas pulse duration time may be compared to a maximum pressurized gas pulse duration time. The maximum pressurized gas pulse duration time may be based on or correlated with the target tire pressure. More specifically, the maximum pressurized gas pulse duration time may be a pulse length that may open the tire valve when the tire is inflated to the target tire pressure. If the current pressurized gas pulse duration time is greater than the maximum pressurized gas pulse duration time, then the tire may be inflated to at least the target tire pressure (i.e., the tire is not underinflated) and the method may end at block 104 (presuming proper operation of the pressurized gas source 32 and the gas supply subsystem 34). If the current pressurized gas pulse duration time is not greater than the maximum pressurized gas pulse duration time, then the method may continue at block 106.

At block 106, a pulse of pressurized gas may be provided to the tire and the pulse pressure may be measured. A pressurized gas pulse may be provided by opening and closing the inlet valve 42 and the outlet valve 44 as will be discussed in more detail below with reference to FIG. 3.

At block 108, the pressure of the current pressure pulse or current pulse pressure is compared to the target tire pressure. The current pulse pressure may be measured or determined based on data from the second pressure sensor 48 when the inlet valve 42 is closed. If the current pulse pressure is not less than the target tire pressure, then the tire is inflated to at least the target tire pressure (i.e., the tire is not underinflated) and the method may end at block 104. If the current pulse pressure is less than the target tire pressure, then the method may continue at block 110.

At block 110, the method may determine whether there is sufficient confidence that the tire is underinflated or sufficient confidence in the current pulse pressure reading. There may be sufficient confidence that the tire is underinflated when generally stable or repeatable low pressure readings are detected. Thus, there may be sufficient confidence that the current pulse pressure is accurate when the current pulse pressure is sufficiently close to a previous pulse pressure reading associated with a previous pressure pulse that may have a different magnitude than the current pressure pulse. Mathematically, sufficient confidence may exist when the difference between the current pulse pressure and the previous pulse pressure are within a threshold range or threshold amount of each other. The threshold amount or threshold range may be constant and may be based on vehicle development testing.

For example, if the previous pulse of pressurized gas (i.e., the previous pressure pulse) and current pressure pulse opened the tire valve 26 (due to an underinflated tire) and a rapid tire pressure leak is not in progress, then the second pressure sensor 48 may detect substantially similar pressure readings after each pulse and after the tire pressure equalizes with the supply line pressure. If a rapid tire pressure leak is in progress, then the second pressure sensor 48 may detect substantially different pressure readings for each pulse due to the leak. As such, the difference between the current pulse pressure and the previous pulse pressure may not be within the threshold range. Likewise, the current measured pulse pressure and the previous measured pulse pressure may not be within the threshold range when the tire valve 26 is not opened by successive pressure pulses. For instance, the pulse pressure during the current iteration may be higher than the pulse pressure during the previous iteration since the pressure pulse duration (and thus the effective pressure) may be increased each iteration.

If there is sufficient confidence that the current pulse pressure measurement is accurate, then the method may continue at block 112. If there is not sufficient confidence that the current pulse pressure measurement is accurate, then the method may continue at block 114.

At block 112, the tire may be inflated. The tire may be inflated because the detected pressure is less than the target tire pressure at block 108 (i.e., the tire is underinflated) and there is sufficient confidence that the current pressure reading is accurate at block 110.

At block 114, the method may determine whether a maximum number of pressurized gas pulses has been exceeded. This step may allow the method to terminate after a predetermined number of iterations in the event that pressure readings of sufficient confidence are not obtained within a predetermined number of iterations or predetermined period of time. The maximum number of pressurized gas pulses may be a predetermined value that may be based on vehicle development testing. If the maximum number of pressurized gas pulses has been exceeded, then the method may continue at block 116. If the maximum number of pressurized gas pulses has not been exceeded, then the method may continue at block 118.

At block 116, an alert, alarm, or error message may be provided to the driver. The alert, alarm, or error message may be of any suitable type, such as an audible and/or visual signal, and may identify a tire and warn the driver that acceptable or repeatable tire pressure readings have not been obtained and/or that there may be a potential issue with the tire or the supply of pressurized gas to the tire with the pressurized gas source 32 or the gas supply subsystem 34.

At block 118, the current pressurized gas pulse duration time may be stored or used to establish a previous pressurized gas pulse duration time for the next iteration. A current pressurized gas pulse duration time may be based on the previous or prior pressurized gas pulse duration time. A current pressurized gas pulse duration time may be greater than, less than, or equal to a previous pressurized gas pulse and may be configured such that the pressure exerted by a pressurized gas pulse may increase during the next iteration. For example, the previous pressurized gas pulse duration time may be set equal to the current pressurized gas pulse duration time. Next, the previous pressurized gas pulse duration time may be increased by a predetermined amount so that a greater pressurized gas pulse duration time is generated at block 100 during the next iteration. The previous pressurized gas pulse duration time may be increased in a linear or nonlinear manner. For example, the previous pressurized gas pulse duration time may be increased by a predetermined constant amount each iteration. Alternatively, the previous pressurized gas pulse generation value may be increased by a nonlinear amount that may not be constant. A nonlinear amount may be used to more rapidly increase the pressurized gas pulse duration time during an iteration. A rapid increase in the pressurized gas pulse duration time may be desired when the current pulse pressure measurement differs greatly from the target tire pressure. The method may then return to block 100 to repeat the method steps until the method terminates at block 104, 112, or 116.

Referring to FIG. 3, a flowchart depicting steps that may be associated with providing a pressurized gas pulse is shown in more detail. These steps may be executed in conjunction with block 106.

At block 200, the inlet valve 42 and the outlet valve 44 may be opened to allow pressurized gas to flow from the pressurized gas source 32 to a tire valve 26. The inlet valve 42 and the outlet valve 44 may open at approximately the same time. Alternatively, the outlet valve 44 may open before the inlet valve 42 to inhibit potential damage to the outlet valve 44 or other hardware. The inlet valve 42 and the outlet valve 44 may both remain open for an amount of time equal to the current pressurized gas pulse duration time.

At block 202, the inlet valve 42 may be closed when the current pressurized gas pulse duration time has elapsed. Closing the inlet valve 42 terminates the flow of pressurized gas from the pressurized gas source 32 to the tire valve 26 and ends the pressurized gas pulse.

At block 204, a delay may be executed to allow the pressure between the inlet valve 42 and the tire valve 26 to stabilize to improve the accuracy of a pressure reading may be obtained with the second pressure sensor 48. For instance, the pressure may be allowed to stabilize by waiting a predetermined amount of time before using pressure data from the second pressure sensor 48. The predetermined amount of time may be based on vehicle development testing.

At block 206, pressure data from the second pressure sensor 48 may be obtained or utilized.

At block 208, the outlet valve 44 may be closed. Closing the outlet valve 44 may also allow the conduit 40 between the outlet valve 44 and the tire valve 26 to be vented to the surrounding environment prior to executing a subsequent pressurized gas pulse. Closing the outlet valve 44 may also allow a pressure check to be executed for another tire 22. The execution order of blocks 206 and 208 may be swapped in one or more embodiments.

An exemplary method execution scenario will now be described for illustration purposes of the iterative aspects of the method. In the text below, the words "first" and "second" reflect a relationship relative to each other. As such, a first pressurized gas pulse may precede a second pressurized gas pulse, but the first pressurized gas pulse may or may not be the initial pressurized gas pulse.

A first pressurized gas pulse duration time may be determined. A first pulse of pressurized gas may be delivered from a pressurized gas source to a tire for the first pressurized gas pulse duration time by actuating the inlet valve 42 and outlet valve 44 as described with respect to FIG. 3. The pressure of pressurized gas associated with the first pulse may be measured with the second pressure sensor 48. Next, a second pressurized gas pulse duration time may be determined based on the first pressurized gas pulse duration time and the supply pressure of pressurized gas. The second pulse of pressurized gas may be delivered from the pressurized gas source to the tire for the second pressurized gas pulse duration time by actuating the inlet valve 42 and outlet valve 44 as previously discussed and may have a greater pressure than the first pulse. The pressure of pressurized gas associated with the second pulse may be measured with the second pressure sensor 48. The pressure associated with the first pressurized gas pulse may be compared with the pressure associated with the second pulse to determine if there is sufficient confidence in the pressure readings. If there is sufficient confidence in the pressure readings (e.g., the first pressurized gas pulse is within a predetermined amount of the pressure associated with the second pressurized gas pulse), then the tire is underinflated and the inlet valve 42 and outlet valve 44 may be opened to inflate the tire 22. If there is not sufficient confidence in the pressure readings (e.g., the first pressurized gas pulse is not within a predetermined amount of the pressure associated with the second pressurized gas pulse) and the maximum duration time has not been exceeded (block 102) and the pressure associated with the second pulse is less than the target pressure (block 108), then a third pulse of pressurized gas may be provided to the tire. The third pulse of pressurized gas may be provided for a third pressurized gas pulse duration time that may be longer than the second pressurized gas pulse duration time. Additional pressure pulses may be provided until the method terminates at block 104, 112, or 116.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling inflation of a tire comprising:
   determining a tire pressure by:
      providing a pulse of pressurized gas to a tire valve, wherein the pulse of pressurized gas does not open the tire valve when the tire pressure is greater than or equal to a target tire pressure;
      measuring a pressure of the pulse of pressurized gas to obtain a measured pressure; and
   comparing the pressure of the pulse of pressurized gas to a pressure of a previous pressure pulse of pressurized gas to determine whether there is confidence that the measured pressure is accurate when the pressure is less than the target tire pressure.

2. The method of claim 1 wherein the pressure of the pulse of pressurized gas is less than the target tire pressure.

3. The method of claim 1 further comprising inflating the tire when the pressure of the pulse is less than the target tire pressure and there is sufficient confidence that the measured pressure is accurate when the measured pressure is within a threshold amount of the pressure of the previous pressure pulse of pressurized gas provided to the tire valve.

4. The method of claim 3 wherein the pulse of pressurized gas is delivered at a higher pressure than the previous pressure pulse.

5. The method of claim 3 wherein the pulse of pressurized gas is provided by a pressurized gas source and a pulse duration of the pulse of pressurized gas is based on a supply pressure of pressurized gas from the pressurized gas source.

6. The method of claim 5 wherein the pulse duration of the pulse of pressurized gas is based on a pulse duration for the previous pressure pulse.

7. The method of claim 6 wherein the pulse of pressurized gas has a pulse duration that is greater than the pulse duration of the previous pressure pulse.

8. The method of claim 1 wherein pressure of the pulse of pressurized gas is measured by a pressure sensor disposed outside the tire.

9. A method of controlling inflation of a tire comprising:
   determining a first pressurized gas pulse duration time;
   providing a first pulse of pressurized gas from a pressurized gas source to the tire for the first pressurized gas pulse duration time;
   measuring a pressure of pressurized gas associated with the first pulse;
   determining a second pressurized gas pulse duration time;
   providing a second pulse of pressurized gas from the pressurized gas source to the tire for the second pressurized gas pulse duration time that differs from the first pressurized gas pulse duration time;
   measuring a pressure of pressurized gas associated with the second pulse; and
   comparing the pressure associated with the first pulse with the pressure associated with the second pulse;
   wherein the tire is underinflated when the pressure associated with the first pulse is within a threshold amount of the pressure associated with the second pulse.

10. The method of claim 9 further comprising inflating the tire with pressurized gas from the pressurized gas source when the tire is underinflated.

11. The method of claim 9 wherein the first pressurized gas pulse duration time is less than the second pressurized gas pulse duration time.

12. The method of claim 9 further comprising providing a third pulse of pressurized gas to the tire for a third pressurized gas pulse duration time that is longer than the second pressurized gas pulse duration time when the pressure associated with the second pulse is less than a target tire pressure and the pressure associated with the second pulse is not within the threshold amount of the pressure of the first pulse.

13. The method of claim 9 wherein determining the second pressurized gas pulse duration time is based on the first pressurized gas pulse duration time and a pressure of pressurized gas from the pressurized gas source.

14. The method of claim 9 further comprising determining whether a maximum number of pressurized gas pulses has been exceeded and activating an alert when the maximum number of pressurized gas pulses has been exceeded.

15. A tire inflation system comprising:
    a pressurized gas source that provides a pressurized gas to a tire;
    an outlet valve that controls flow of pressurized gas to the tire;
    an inlet valve that controls flow of pressurized gas to the outlet valve;
    a first pressure sensor that detects pressure of the pressurized gas provided by the pressurized gas source;
    a second pressure sensor disposed between the inlet valve and the outlet valve; and
    an electronic controller that controls operation of the tire inflation system by opening the outlet valve and the inlet valve to deliver a pulse of pressurized gas from the pressurized gas source, closing the inlet valve after a current pressurized gas pulse duration time has elapsed, waiting for a predetermined period of time to allow the pressure to stabilize between the inlet valve and the tire, and measuring a pulse pressure of the pulse of pressurized gas with the second pressure sensor;
    wherein the measured pressure is indicative of a tire pressure when the pulse pressure is less than a target tire pressure and the measured pressure is within a threshold amount of a pressure value of a previous pressure pulse.

16. The system of claim 15 wherein the outlet valve is closed after measuring pressure with the second pressure sensor.

17. The system of claim 15 wherein the tire has a tire valve and the pulse of pressurized gas does not open the tire valve.

18. The system of claim 15 wherein the first pressure sensor is disposed between the inlet valve and the pressurized gas source.

19. The system of claim 15 wherein the current pressurized gas pulse duration time is based on data from the first pressure sensor.

20. The system of claim 19 wherein the current pressurized gas pulse duration time is based on a pressurized gas pulse duration time for the previous pressure pulse.

* * * * *